H. O. WURMSER.
MEANS FOR STARTING OR CRANKING GAS OR EXPLOSIVE ENGINES.
APPLICATION FILED FEB. 1, 1910.
984,252.
Patented Feb. 14, 1911.
2 SHEETS—SHEET 1.
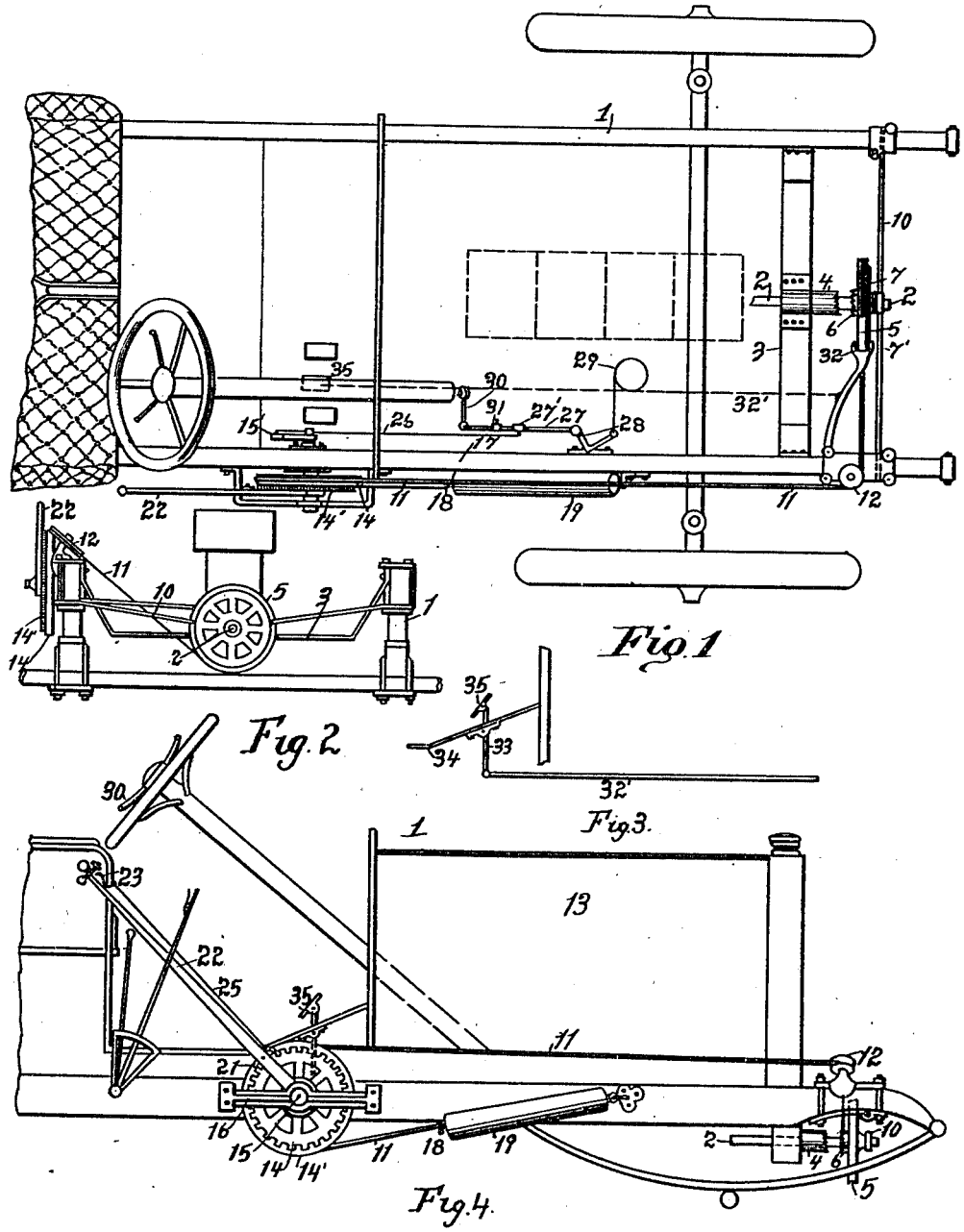

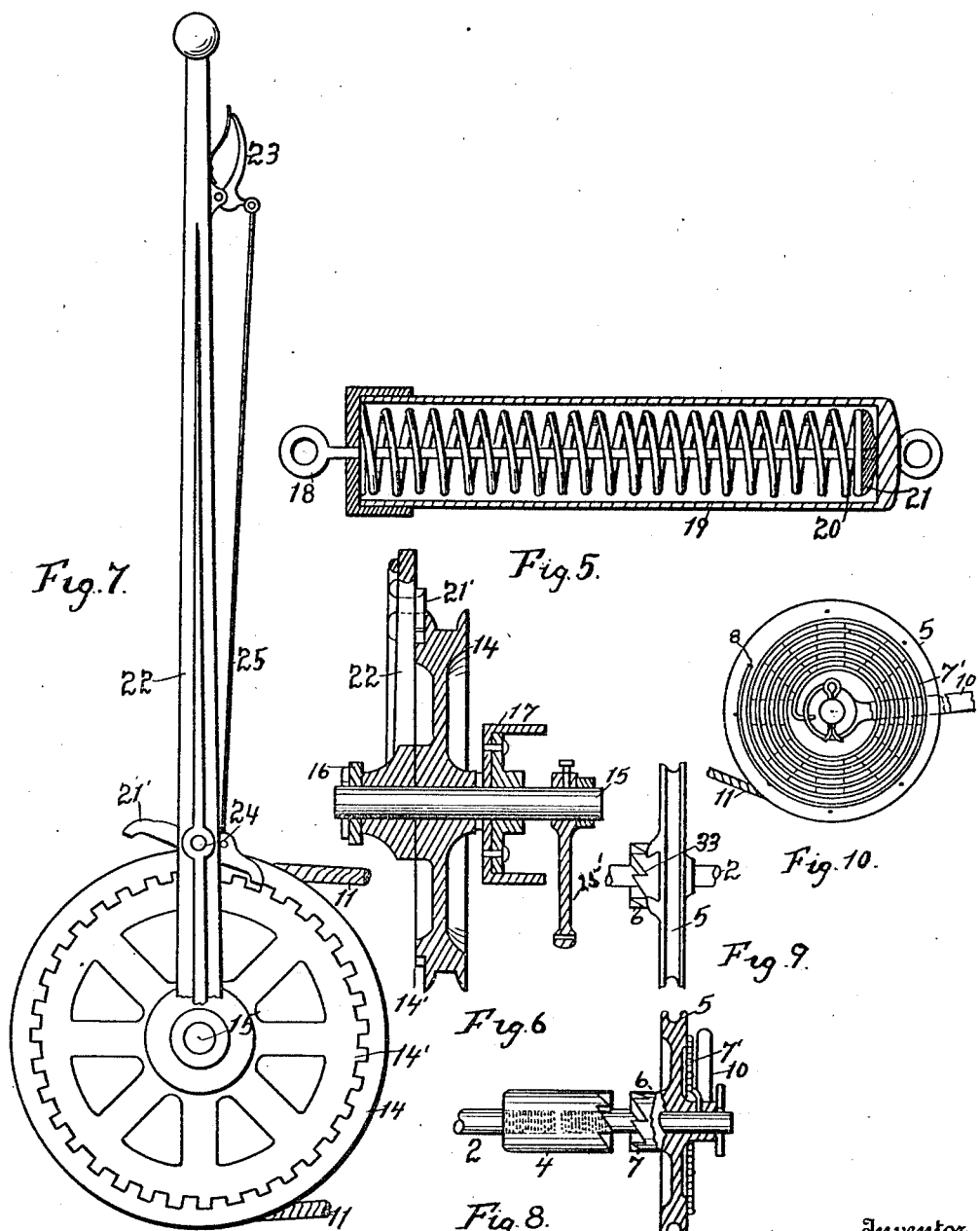

UNITED STATES PATENT OFFICE.

HENRY O. WURMSER, OF LORAIN, OHIO.

MEANS FOR STARTING OR CRANKING GAS OR EXPLOSIVE ENGINES.

984,252. Specification of Letters Patent. Patented Feb. 14, 1911.

Application filed February 1, 1910. Serial No. 541,381.

*To all whom it may concern:*

Be it known that I, HENRY O. WURMSER, a citizen of the United States, residing at Lorain, in the county of Lorain and State of Ohio, have invented certain new and useful Improvements in Means for Starting or Cranking Gas or Explosive Engines, of which the following is a specification.

This invention has relation to means for starting or "cranking" gas or explosive engines and is especially applicable to automobiles or other vehicles driven by gas or explosive engines.

The object of the invention is to allow the driver to start or "crank" the engine while he is seated on the vehicle and the invention consists in the provision of means whereby the necessary operations for cranking the engine and controlling the sparking device may be performed through the medium of a suitable starting lever located adjacent to the driver's seat and through the medium of a foot lever or pedal within convenient reach of the driver's foot.

In the accompanying drawing I have illustrated my invention as applied to an automobile of the usual type and: Figure 1 is a plan view of the automobile with the starting or cranking device embodying my invention. Fig. 2 is a front elevation of the same. Fig. 3 is a side view of the treadle or foot lever and connected rope. Fig. 4 is a side elevation of part of the part of an automobile to which my improvements are applied. Fig. 5 is a central sectional view of casing and inclosed compressor spiral spring. Fig. 6 is a vertical sectional view of the combined pulley and ratchet wheel through which the operating lever transmits power to the other cranking devices. Fig. 7 is a side elevation of the operating lever and the combined pulley and ratchet wheel. Fig. 8 is a vertical sectional view of the cranking wheel of the power shaft. Fig. 9 is a side view of the device shown in section in Fig. 8. Fig. 10 is a face view of the same with attached spring.

The forward part of the frame and running gear of the automobile, shown in Figs. 1 and 2, is designated 1 and needs no specific description.

2 designates the crank shaft of the engine running lengthwise centrally of the frame, and mounted at its forward end on the cross beam 3. At its forward end the shaft 2, is divided and its sections threaded and connected together by a nut or collar 4, toothed on its forward end to form a clutch member.

5 designates a cranking wheel which is loosely mounted on the forward section of the shaft 2, so as to be adjustable lengthwise of the shaft, and has a rearwardly projecting hub 6, formed with clutch teeth 7, to match and engage with the teeth of the member 4. By sliding the wheel 5 upon the shaft 2, it is brought into and out of actuating connection with said shaft. A flat coiled or helical spring 7' is mounted on the outer face of the wheel 5, the outer end being secured in a hole 8 in the rim of the wheel and the inner end secured to a cross brace-bar 10, of the vehicle. The periphery of the wheel 5 is grooved to receive a rope, chain or cable 11, which is secured at one end in a hole in the wheel and passes from said wheel to and around a pulley 12, mounted at one of the front corners of the vehicle and thence continues back, at the side of the vehicle to a point in the rear of the engine hood 13. At this point a combined pulley and ratchet wheel 14, 14' is mounted on a horizontal axis at the side of the vehicle, its short horizontal shaft 15, being journaled outside the wheel 14, in a cleat or bracket 16, bolted to the main frame of the vehicle and journaled on the inner side of the wheel 14, in the side bar 17, of the main frame of the vehicle.

The rope, chain or cable 11, passes over, around and under the pulley 14, and at its lower end is attached to a rod 18, which passes axially through the end of and into a cylindrical casing 19, and through a strong coiled spring 20, contained in said casing. At its forward end, the rod 18, carries a head 21, which bears against the end of the spring 20. The casing 19 is secured to the side of the main frame of the vehicle and the spring 20 is compressed therein when the rod is pulled, through the medium of the rope, chain or cable 11.

The combined pulley and ratchet wheel 14, 14′ is loose upon the shaft 15, but is brought into engagement therewith by means of the double ended dog 21′, carried by the upright lever 22, which is keyed or otherwise rigidly attached to the shaft 15. A spring controlled latch 23, is pivoted to the upper part of the lever 22, in position so that it can be grasped easily and conveniently by the driver while manipulating the lever 22. The latch 23 is connected forward of its pivoted point 24, to the dog 21′, by a rod 25.

The shaft 15 has keyed on its inner end a crank arm 15′ which is connected by a rod 26 to a sleeve 27′ on the rod 27 which is connected at its forward end to one limb of a bell crank 28, the other limb of said bell crank being connected to the spark timer 29. The rod 27 is coupled at its rear end to the spark lever 30, and has mounted on it a nut 31, against which the sleeve 27′ strikes, causing the rod 27 to move back and retard the spark, when the sleeve 27′ is slid back on the rod 27 by the movement of the crank arm 15′ and rod 26 when operated by the lever 22 and connections.

31′ designates a lever arm pivoted to the frame of the vehicle at one side near the forward end, and having a forked head 32 which embraces the rim of the cranking wheel 5. This lever is connected at its middle part by a rope or other suitable connection 32′ to the lower end of a pedal lever 33, pivotally mounted on the foot board 34, and provided with a pedal 35, which is pressed forward and downward to draw the cranking wheel back into clutch engagement with the crank shaft of the engine.

The operation of the starting mechanism is as follows: Assuming the starting lever 22, to be in the position shown in Fig. 4, and the dog 21′, in engagement through its forward end with the teeth of the ratchet wheel 14′, the cranking wheel 5, is then out of clutch engagement with the shaft of the engine. The lever 22, is now thrown forward as far as possible and the wheels 14, 14′ thereby partially rotated forward. The cord or cable 11, is thus relaxed and the tension on the wheel 5, relieved, whereupon the wheel 5 rotates backward under the impulse of its spring 7′ and winds up on its periphery the slack of the cable 11. At the same time the spark is retarded by the movement of the crank 15′, rod 26 and sleeve 27′ and the spring 20 compressed by the pull of the lower length of the cable 11. The pedal 35 is now operated by the foot of the driver and the wheel 5 pulled back into clutch engagement with the engine shaft, through the operation of the shifting lever 31′, and connection 32′. The dog 21, is now brought into reverse engagement with the ratchet wheel by means of the latch 23 and the operating lever pulled back. This operation reverses the wheels 14, 14′ and by consequently unwinding the cord or cable 11 from the wheel 5, rotates the latter forward, such rotation being assisted by the expansion pull of the spring 20. The partial rotation of the crank shaft of the engine thus produced is sufficient to start the engine. If this starting does not immediately occur, the operations just described may be repeated. A radial dovetail slot 33, is formed on the rear face of the pulley wheel 5, said slot being adapted to receive a removable cranking handle of ordinary construction, (not shown) which may be used to start the engine by hand in case it should ever be necessary to do so.

I claim:

1. In an engine starting device, the combination with an engine shaft, a clutch member carried thereby, a cranking pulley, a clutch member carried by the cranking pulley and means for bringing said clutch members into and out of engagement, of a ratchet wheel and pulley, a shaft on which said ratchet wheel and pulley are fixed, a spring, a flexible connection between said spring and said cranking pulley, said flexible connection engaging the pulley carried on the shaft of said ratchet wheel and a lever having a dog adapted to engage the said ratchet wheel.

2. In an engine starting device, the combination with an engine and a sparking device of a starting lever, means for imparting movement from the starting lever to the engine shaft and means operable by said starting lever for retarding said sparking device, said means including a crank arm on the shaft of the lever, a rod connected to the spark lever, a nut on said rod and a sleeve on said rod connected to said crank arm.

3. In an engine starting device, the combination of a cranking pulley, a flexible member normally wound on said pulley, means for exerting traction in either direction on said flexible member comprising a rocking lever and a pulley a spring connected to said flexible member and adapted to oppose the motion of said flexible member in one direction and assist its movement in the opposite direction and means for engaging said cranking pulley with the engine shaft and disengaging the same.

4. A starting or cranking device for motor vehicles comprising a cranking pulley adapted to be brought into and out of engagement with the engine shaft, a spring connected to said pulley to automatically rotate the same, a cord or cable connected and adapted to be wound on said pulley when said cord or cable is slackened, a pulley mounted on a shaft in the rear of the engine, around which said cord or cable runs, a spring to which said cord is connected at one end, a ratchet wheel mounted to turn with said last named pulley, an operating lever and means for engaging said lever with said ratchet wheel to turn it in opposite directions, a shifting lever for said cranking pulley and foot controlled means for operating said shifting lever.

In testimony whereof I affix my signature, in presence of two witnesses.

HENRY O. WURMSER.

Witnesses:
MARY O'KEEFE,
DANIEL C. FISHER.